(12) United States Patent
Nance

(10) Patent No.: US 8,210,552 B2
(45) Date of Patent: *Jul. 3, 2012

(54) COMPRESSION AND TORSION DAMPING WHEEL SUSPENSION SYSTEM

(76) Inventor: John D. Nance, Ringoes, NJ (US)

(*) Notice: Subject to any disclaimer, the term of this patent is extended or adjusted under 35 U.S.C. 154(b) by 204 days.

This patent is subject to a terminal disclaimer.

(21) Appl. No.: 12/661,428

(22) Filed: Mar. 17, 2010

(65) Prior Publication Data

US 2011/0192128 A1 Aug. 11, 2011

Related U.S. Application Data

(63) Continuation-in-part of application No. 12/658,467, filed on Feb. 8, 2010.

(51) Int. Cl.
*B60G 3/18* (2006.01)
(52) U.S. Cl. .................................. 280/124.135
(58) Field of Classification Search ........... 280/124.134, 280/124.135, 124.136, 124.137; 56/229, 56/322
See application file for complete search history.

(56) References Cited

U.S. PATENT DOCUMENTS

| | | | |
|---|---|---|---|
| 5,355,664 A | 10/1994 | Zenner | 56/15.8 |
| 5,951,400 A | 9/1999 | Giere | 464/99 |
| 5,960,614 A | 10/1999 | Jones | 56/15.2 |
| 6,101,796 A | 8/2000 | Wattron et al. | 56/13.6 |
| 6,170,242 B1 * | 1/2001 | Gordon | 56/15.8 |
| 6,213,883 B1 | 4/2001 | Giere | 464/99 |
| 6,244,025 B1 * | 6/2001 | Ferris et al. | 56/15.8 |
| 6,510,678 B2 * | 1/2003 | Ferris et al. | 56/15.8 |
| 6,857,254 B2 | 2/2005 | Melone et al. | 56/15.8 |
| 6,912,832 B1 | 7/2005 | Thompson et al. | 56/14.7 |
| 7,086,214 B2 | 8/2006 | Thompson et al. | 56/14.7 |
| 7,107,746 B2 * | 9/2006 | Melone et al. | 56/15.8 |
| 7,930,813 B2 * | 4/2011 | Melone et al. | 29/428 |

* cited by examiner

*Primary Examiner* — Faye M. Fleming
(74) *Attorney, Agent, or Firm* — Ernest D. Buff; Ernest D. Buff & Assoc. LLC

(57) ABSTRACT

A compression and torsion damping wheel suspension system is useful for damping compressive and torsional shock encountered by freewheeling front caster wheels of a professional landscape lawn mower. The freewheeling caster wheels are mounted with an offset from a vertical pivot axis attached to the lawn mower frame. The compression and torsion damping wheel suspension system comprises two tubes one having internal extending projections and the other having external extending projections The smaller tube is turned within the larger tube, leaving behind several spaces within which are contained four elastomeric elements. When the caster wheel rides over a rock or bump, the elastomeric elements are compressed, damping compression shock. Caster wheel resistance is felt; the elastomeric elements experience torsion and are damped, providing a smooth ride for the operator.

13 Claims, 6 Drawing Sheets

COMPRESSION AND TORSION DAMPING WHEEL SUSPENSION SYSTEM

CROSS-REFERENCE TO RELATED APPLICATIONS

This application is a continuation-in-part of U.S. patent application Ser. No. 12/658,467, filed Feb. 8, 2010, entitled "Compression And Torsion Damping Wheel Suspension System", the disclosure of which is hereby incorporated by reference.

BACKGROUND OF THE INVENTION

1. Field of the Invention

The present invention relates to a wheel damping suspension systems; and more particularly, to a compression and torsion damping wheel suspension system for a near zero turn radius lawnmower which enables the lawnmower to mow at greater speeds without subjecting the operator to excessive jarring due to rough lawn terrain.

2. Description of the Prior Art

Many patents address issues related to lawnmowers and other landscape equipment. Specifically, the compression and torsion damping feature at the connection to freewheeling front caster wheels is not disclosed.

U.S. Pat. No. 5,355,664 to Zenner discloses a caster wheel suspension and shaft tensioning system for turf maintenance equipment. A rotary mower has a castering wheel assembly so as to reduce rotation of the castering wheel about its support shaft. A torsion resistance mechanism is interposed between the shaft and the mower frame. The torsion resistance mechanism includes a resilient material rigidly bonded to a sleeve within which the shaft is retained. The resilient material is press fit into a housing, which is rigidly bonded to the mower frame. Alternatively, a cap housing a spring is attached by threads to the castering wheel support shaft. Rotation of the cap compresses spacers mounted co-axially on the shaft while urging the shaft in an upward direction so as to prevent axial rotation of the shaft when the castering wheel loses contact with the ground. The free wheeling front rolls of the lawnmower have a vertical shaft attached to a caster wheel encased in a resilient material thereby preventing lateral movement of a front caster wheel. The castering wheel assembly has a torsional resistance mechanism, which resists rotation of the castering wheel about its generally vertical support shaft. The torsional resistance mechanism also provides some degree of shock absorption between the castering wheel and the mower deck frame, especially to lateral (i.e. substantially horizontally acting) loads placed upon the wheel. The torsional resistance mechanism restricts the maximum angular rotation of the castering wheel support shaft to approximately twenty degrees under normal or typical loads. The torsional resistance mechanism is not in line with the axis of rotation of the caster wheel and is incapable of absorbing vertical shock to the user or suppressing sudden resistance load applied to the caster wheel by a bump on the lawn-mowing field.

U.S. Pat. No. 5,951,400 to Giere discloses a flexible coupling for use between two shafts. This is a constant velocity flexible coupling for direct drive to the wheels of a low speed light duty wheeled vehicle or 4-wheel drive steer lawn tractor having discs which flexibly couple a drive shaft to a wheel flange. The flexible coupling is for use in connecting a vehicle's drive shaft to a vehicle's wheel flange. The coupling includes first and second flexible disc members with opposed portions of the first flexible disc member rigidly connected to each other and to opposed portions on the second flexible disc member. This is a constant velocity coupling. U.S. Pat. No. 6,213,883 to Giere is a continuation in part of U.S. Pat. No. 5,951,400. The '400 patent discloses a flexible coupling for use between two shafts. The flexible coupling is appointed for use in a steerable drive shaft. The constant velocity flexible coupling is inserted between a drive shaft and driven machinery. The flexible coupling is not on a shaft that is attached to a freewheeling caster wheel not connected to drive power.

U.S. Pat. No. 5,960,614 to Jones discloses a torsion hitch for a tractor with a fence mower. This versatile hitch is attached to a tractor, which positions a ground-based implement, such as a mower, in front or to either side of the tractor. The hitch cushions or dampens movement using a torsional component over rough ground by the tractor, allowing the implement to traverse a near parallel ground direction. The mower design mows either normally over open ground or in restricted locations, such as around fences supported by posts. The '614 patent discloses a torsion hitch for a tractor with a fence mower. This system provides a hitch that has a torsion restraining member. In one embodiment, this torsion restraining member has two square cross section tubes provided with an elastomeric shock absorption element, such as rubber body. The torsion restraining member is not attached to a mower body at one end and is not connected to a freewheeling caster wheel at the other end.

U.S. Pat. No. 6,101,796 to Wattron et al. discloses a mower including a device preventing the vibrations from being transmitted between the cutting mechanism and the carrying structure. This mower includes a cutting mechanism connected to a carrying structure by connections wherein each connection includes a device preventing at least some of the vibrations from being transmitted between the cutting mechanism and the carrying structure. The cutting mechanism includes a gear box at which are arranged cutting members. Each cutting member rotates about a respective axis of rotation which is at least approximately vertical during work. The carrying structure to which the cutting mechanism is connected includes at least one connection, which has a flexible element. The attachment between a tractor and the cutting mechanism has a plurality of connections that utilize an elastomeric ring to isolate vibrations. The elastomeric vibration-isolating ring is not attached to a shaft.

U.S. Pat. No. 6,857,254 to Melone et al. discloses a mower suspension system and method. The mower front independent suspension assembly includes a first suspension arm connected to the front of the lawnmower frame and a second suspension arm connected to the side of the lawnmower frame. The first suspension arm is connected to the front of the frame at or near the longitudinal center of the frame, while the second suspension arm is connected to the side of the frame a distance from the front of the frame. Alternatively, the cutter deck of the lawnmower is connected to the front independent suspension assemblies for movement therewith. The first and second front wheels independently movable upward and downward with respect to one another and coupled to the frame for upward and downward movement with respect to the frame. A pair of suspension arms are pivotally coupled to the frame and coupled to one of the front wheels. This lawnmower has front wheels connected to a strut that is pivoted on the lawnmower's mainframe front. The strut is provided with a compression spring adapted to cushion the ride. There are no elastomeric elements within the suspension system; the system does not respond when resistance to movement of the front wheels imparts torsion to the strut.

U.S. Pat. No. 6,912,832 to Thompson et al. discloses a mower suspension. A suspension system for a tractor-drawn mower used for crops for agricultural purposes is made up of parallel links, connected at a first end to a frame and to a mowing unit at a second end. A torsion spring assembly, similar to that used for torsion axles, is used to bear a portion of the weight of the mowing unit when the mowing unit is in a lower, mowing position. All torsional stress is removed from the torsion spring when the mowing unit is in a transport position. During mowing, the weight of the mowing unit is divided up between the torsion spring and the surface of the ground. The ratio of the weight supported by the ground to that supported by the torsion spring is adjustable by an operator. U.S. Pat. No. 7,086,214, which is a continuation-in-part of U.S. Pat. No. 6,912,832, discloses a similar mower suspension. The mover pivot uses a larger square shaped hollow tube carrying a smaller square shaped hollow tube with rubber elements as shown in FIGS. 4 and 4a to form a mower pivot. Rotation of the outer tube with respect to the inner tube, by rotation of the torsion arm, results in compression of rubber elements 306. The mower pivot is not attached within an offset shaft that connects a pivot axis and a freewheeling caster front wheel of a lawnmower.

There remains a need in the art for a compression and torsion damping wheel suspension system that dampens compressive vertical forces when the professional landscape lawnmower front freewheeling caster wheels traverse a bump in the field or a rock. Also needed in the art is a wheel suspension system that dampens the torsional load when one or both of the front freewheeling caster wheels encounter resistance. Such compressive or torsional forces jar the operator of the professional landscape lawnmower, limiting severely the lawn mowing speed. In the worst case, the rear traction wheels of the professional landscape lawnmower lifts and loses contact with the ground, losing traction and even turning and pointing the professional landscape lawnmower in an unwanted direction.

SUMMARY OF THE INVENTION

The present invention discloses a compression and torsion damping wheel suspension system for near zero turn radius professional landscape lawnmowers powered by back wheel traction. Advantageously, the compression and torsion damping wheel suspension system enables the professional landscape lawnmowers to mow the lawn at greater speeds without subjecting the operator to excessive jarring due to rough lawn terrain. The system of this invention is especially suited for use with a professional landscape lawnmower having individually adjustable powered back wheels. More particularly, the compression and torsion damping wheel suspension system may be attached to an existing professional lawn mower enhancing its comfort and mowing speed. The front wheels of the mower are mounted on casters that orient in appropriate directions, according to the speed and direction of rotation of the individually powered back wheels. With this arrangement, the mower can effect a near zero turn radius; and the front caster wheels have a compression and torsion wheel suspension system that provides a cushioned ride at improved speeds ever over rough terrain.

The first embodiment of the present invention incorporates the compression and torsion damping wheel suspension system within a bolted location that attaches the projection arm to the pivoted yoke of the front wheel suspension. The up and down motion experienced by the caster wheel results in torsional loading of the compression and torsion damping wheel suspension system; this, in turn, results in the squeezing of the elastomeric rubber elements as well as winding a torsional spring provided therein. Any resistance encountered by the caster wheel as it moves along the mowing terrain results in similar torsional load application to the compression and torsion damping wheel suspension system.

The torsion suspension is located in the second embodiment on a projection element that connects the rotation axis of the caster wheel and that of a pivot Y frame attached to the body of the professional landscape lawnmower. This projection element is provided as a user replaceable element, so that prior art landscape mowers with no shock absorbers or vertical spring absorbers providing a rough ride may be converted to a more efficient higher-speed landscape mower by the use of the replaceable, compression and torsion damping wheel suspension system of the present invention.

The compression and torsion dampening wheel suspension system comprises a torsion shock absorption device that has two tubes one about twice the size of the other tube, fitting one inside the other with a clearance therebetween. The interior of the outer tube has a plurality of radially extending inward projections. The inner tube has a plurality of radially protruding projections, and the space between the projections creates spaces within which plurality of elastomeric rubber elements may be inserted. A torsion spring may be advantageously attached. The torsion spring is joined at one end to the inner tube. The other end of the torsion spring is attached to the outer tube. Thus any rotation of the inner tube with respect to the outer tube results in the torsional loading of the torsion spring. In the first embodiment, the outer tube is attached to the projection element at the bolted location while the second embodiment has the compression and torsion dampening wheel suspension system contained the projection element. A torsional spring is additionally provided within the compression and torsion damping wheel suspension system. This torsion spring is connected in parallel with the two tube torsional shock absorption system. Any rotation of the inner tube with respect to the outer tube results in application of torsion to the spring, which results in winding of the torsional spring, absorbing shock and releasing it to overcome any obstruction encountered by the caster wheel.

The compression and torsion dampening wheel suspension system in its simplest form comprises two essentially square shaped tubes, one about twice the size of other square tube cross-section. The smaller square cross section tube is placed within the larger square cross-section tube with its diagonal portion parallel to the straight edge of the large square tube, thereby leaving four spaces between the inner smaller square and the larger square. Four rubber elastomeric elements are inserted into these four spaces and the elastomeric rubber elements are held in compression by welded flanges, which are provided at corresponding ends of the smaller tube and larger tube. The flange of the smaller square cross-section tube is welded to a rod that connects to the pivot Y frame and the flange of the larger square cross-section tube is welded to a rod that connects to the rotation axis of the caster wheel. These connections may be reversed as well and provide the same functionality. A torsion spring may be advantageously attached joined at one end to the inner square tube. The other end of the torsion spring is attached to the outer square tube. With this arrangement, any rotation of the inner square tube with respect to the outer square tube results in the application of torsional loading to the torsion spring.

When the professional landscape lawnmower rides over rough terrain, resistance is felt by the caster wheel movement. The compression and torsion damping wheel suspension system twists; and this shock is absorbed by the rubber elastomeric element instead of the rider of the landscape mower. In a similar manner, any up and down movement of the caster front wheels squeezes the elastomeric rubber elements causing shock absorption. Thus, the rider of the landscape mower can drive the device at nearly twice the speed without discomfort, as compared to currently available landscape mowers that either have no shock absorption features or are equipped with vertical spring support. The compression and torsion damping wheel suspension system of the present invention is a low cost device and is provided as a user replaceable component that is designed to fit any commercially available landscape mower. Once installed, the compression and torsion damping wheel suspension system converts these uncomfortable to ride mowers to high-speed, efficient, comfortable mowers that can be operated at nearly twice the mowing speed.

Significant advantages are realized by practice of the present invention. In its preferred embodiment, the compression and torsion damping wheel suspension system of the present invention comprises:

1) a riding lawnmower, preferably a professional landscape lawn mover, having two power driven back wheels with controlled speed and direction and two freewheeling castered front wheels;

2) said front wheels being mounted on a lawnmower frame using a vertical pivot that permits rotation of an offset shaft around a vertical pivot axis in a horizontal plane;

3) in the first embodiment, said compression and torsion damping wheel suspension system being attached to a horizontal offset shaft at the bolting location to the vertical pivot;

4) in the second embodiment said compression and torsion damping wheel suspension system being contained within the offset shaft that is made in two sections;

5) said compression and torsion damping wheel suspension system comprising a larger hollow tube with internal projections enclosing a smaller diameter hollow tube with external projections creating a plurality of spaces;

6) the outer and inner tubes having a square cross section with the two tubes turned 45 degrees to each other, creating four spaces;

6) a plurality of elastomeric rubber elements in the form of solid circular elements or rubber tubes being inserted in each of said spaces surrounding said smaller diameter second hollow tube;

7) said compression and torsion damping wheel suspension system additionally comprising a torsion spring, one end of which is attached to the inner hollow tube and the other end of which is attached to the outer tube;

whereby the elastomeric rubber elements absorb compressive or torsional shock imparted by the freewheeling caster wheel as said riding lawnmower rides over rough landscape terrain, the operator of said riding lawnmower is provided with a comfortable ride even at high cutting speeds, and the power driven back wheels maintain traction without bounce even when the freewheeling castered front wheels encounter resistance or uneven projections on the landscape being mowed.

BRIEF DESCRIPTION OF THE DRAWING

The invention will be more fully understood and further advantages will become apparent when reference is had to the following detailed description of the preferred embodiments of the invention and the accompanying drawing, in which.

DETAILED DESCRIPTION OF THE INVENTION

Figure 1:
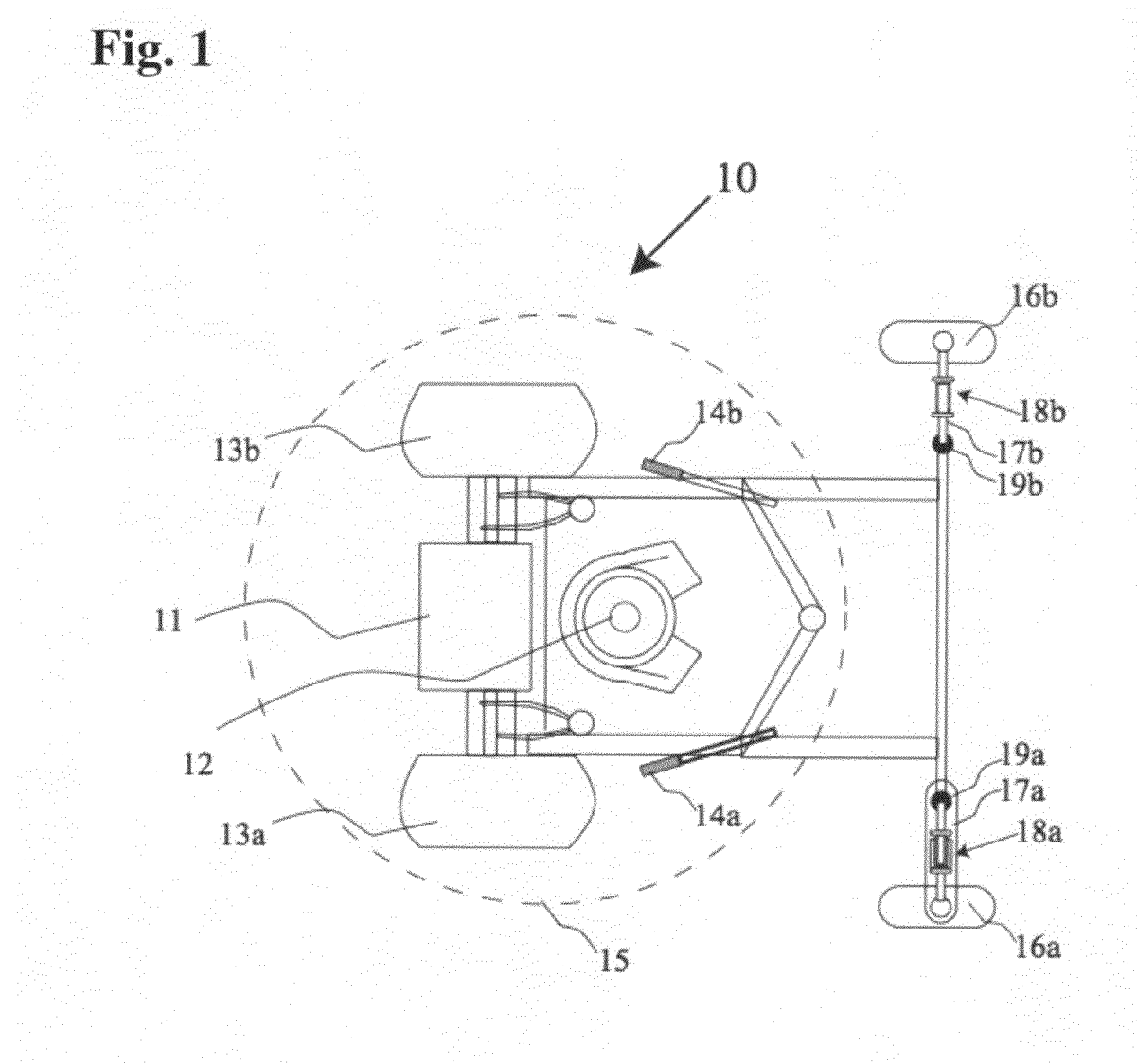
FIG. 1 schematically illustrates the plan view of the professional landscape mower with compression and torsion damping wheel suspension system incorporated in the offset shaft connecting pivot axis and front freewheeling caster wheel on each side.

This invention relates to a professional zero radius turning lawnmower. The lawnmower has two back wheels, which are individually driven and its speed and direction of rotation may be individually controlled by two separate levers that are adjusted by the landscape lawnmower operator. The front wheels are typically mounted on caster wheels, which orient themselves according to the drive conditions set by the powered back wheels of the landscape lawnmower. As a result, the landscape lawnmower can turn sharp corners or reverse lawn mowing direction with ease. The first generation landscape lawnmowers had no shock absorption mechanism for the caster front wheels. This resulted in a hard or jarring ride. When the front caster wheels encountered a rock or other irregularity in the landscape, they turned at an angle oblique to the mower's forward movement, readily dragging the rear wheels on the ground. The second generation of professional landscape lawnmowers used springs disposed vertically above the front caster wheels. These springs did not absorb any vertical shock or torsion frictional torque. A typical four wheel professional lawnmower with driven back wheels is detailed in U.S. Pat. No. 6,189,304 to Velke et al. which discloses a power mower with a riding platform for supporting a standing operator. The professional landscape lawnmower disclosed by the '304 patent does not have any shock absorption features for the front caster wheels.

A professional landscape lawnmower of the present invention has back wheels, which are driven at selected speeds and rotation direction by the operator. The front wheels are freewheeling and are mounted on a vertical pivot with a pivot axis. The front caster wheels have a diameter 'D' and are offset from the pivot axis by a distance that is at least 2D. In this manner, the freewheeling front wheels orient in a direction according to the individual speeds of each of the back wheels, directing the professional landscape lawnmower in a desired direction as selected by the operator of the professional landscape lawnmower. The offset is typically in the form of a steel shaft that is generally horizontal and is typically parallel to the ground. The present invention inserts a unique compression and torsion damping wheel suspension system in the horizontal offset shaft.

Generally stated, the compression and torsion damping wheel suspension system has two square cross section tubes, each of which is attached individually by welding to two portions of the offset shaft. One of the two square cross section tubes, the first square cross section tube, is about twice as large as that of the second square cross section tube. The second square cross section tube fits within the first larger square cross section tube oriented at 45 degrees between the flat faces. In this manner, the second square cross section tube appears like a diamond within the square cross section of the first square cross section tube with four empty spaces surrounding the second square cross section tube. Four elastomeric rubber tubes, inserted into these four spaces, surround the second square cross section tube. A first portion of the offset shaft is welded to the first square cross section tube and a second offset shaft is welded to the second square cross section tube. Torque is thus transmitted from the first offset shaft to the second offset shaft through the elastomeric rubber tubes, which absorb both torsion shock and up and down bouncing loads. With this arrangement, the operator can drive the professional landscape lawnmower at higher speeds without feeling discomfort. The cushioning action of the rubber tubes allows the freewheeling front caster wheels to maintain proper orientation and speeds regardless of landscape terrain problems. The compression and torsion damping wheel suspension system is present in each of the offset shaft that connects to both of the front freewheeling caster wheels. It is essential that the caster wheels do not contact the rotating blade of the lawnmower even when the offset is rotated at all possible orientations around the pivot axis.

FIG. 1 illustrates generally at 10 a plan view of a professional landscape lawnmower. The lawnmower body is shown at 11 and has an engine and a seat 12. Power is individually provided to the back wheels 13a and 13b, which are controlled by two control levers 14a and 14b. Lever 14a controls the speed and direction of wheel 13a. In a similar manner, lever 14b controls the speed and direction of wheel 13b. The professional landscape lawnmower has a blade cutting area shown by dotted circle 15. The front wheels 16a and 16b are attached to offset shafts 17a and 17b having compression and torsion damping wheel suspension system 18a and 18b respectively, shown here contained within the offset shaft according to the second embodiment of the invention. The offset shafts for caster wheels 16a and 16b are attached to vertical pivots 19a and 19b, respectively.

Figure 2A:
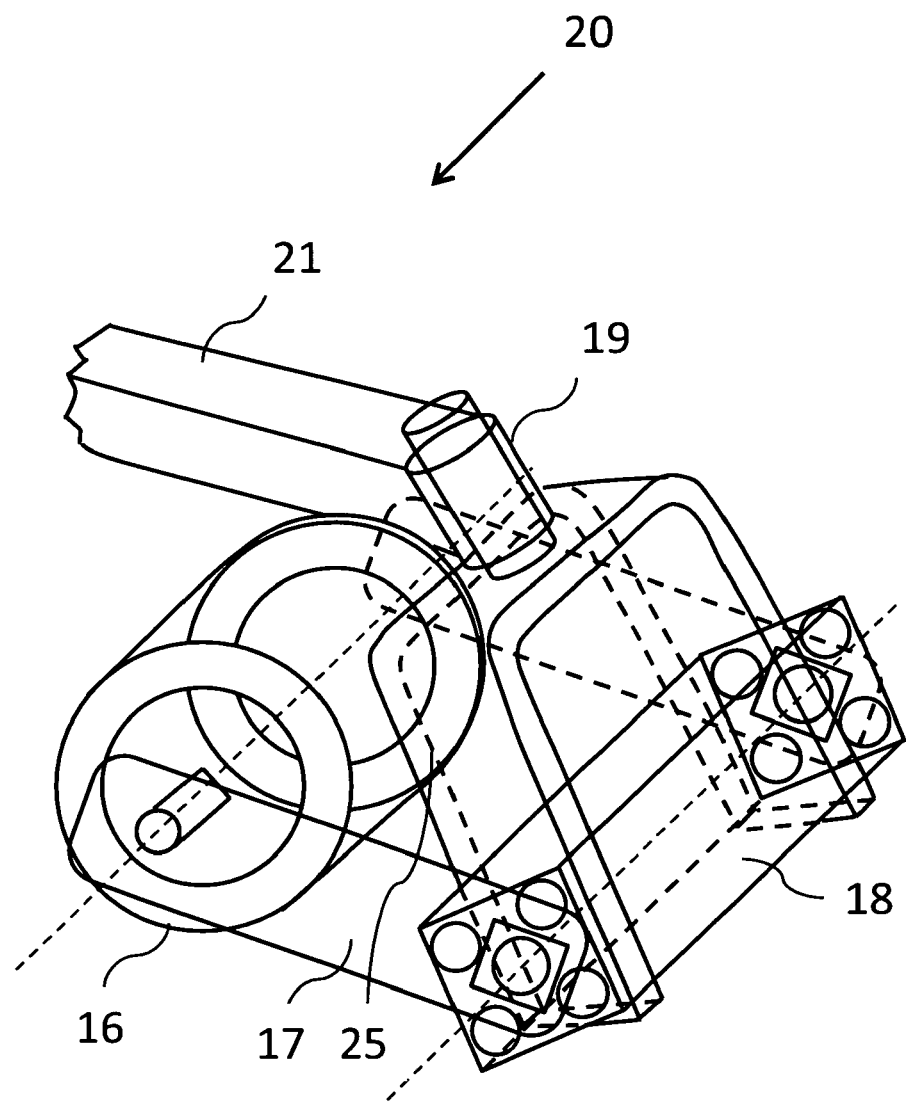
FIG. 2a schematically illustrates the side view of the professional landscape mower with the first embodiment of the compression and torsion damping wheel suspension system incorporated at the bolting location of the offset shaft to the vertical pivot axis.

FIG. 2a schematically illustrates at 20 a side view of the professional landscape mower with the first embodiment of the compression and torsion damping wheel suspension system 18 incorporated at the bolting location of the offset shaft 17 to the vertical pivot axis 19. The body of the lawn mower is attached to a pivot axis yoke 25 using attachment rod 21 that carries the pivot axis 19. The compression and torsion damping wheel suspension system 18 is shown as a smaller square cross section mounted within a larger square cross section tube oriented to each other by 45 degrees leaving behind four spaces that carry four elastomeric rubber elements. The details of this construction ate shown in FIG. 4b below.

Figure 2B:
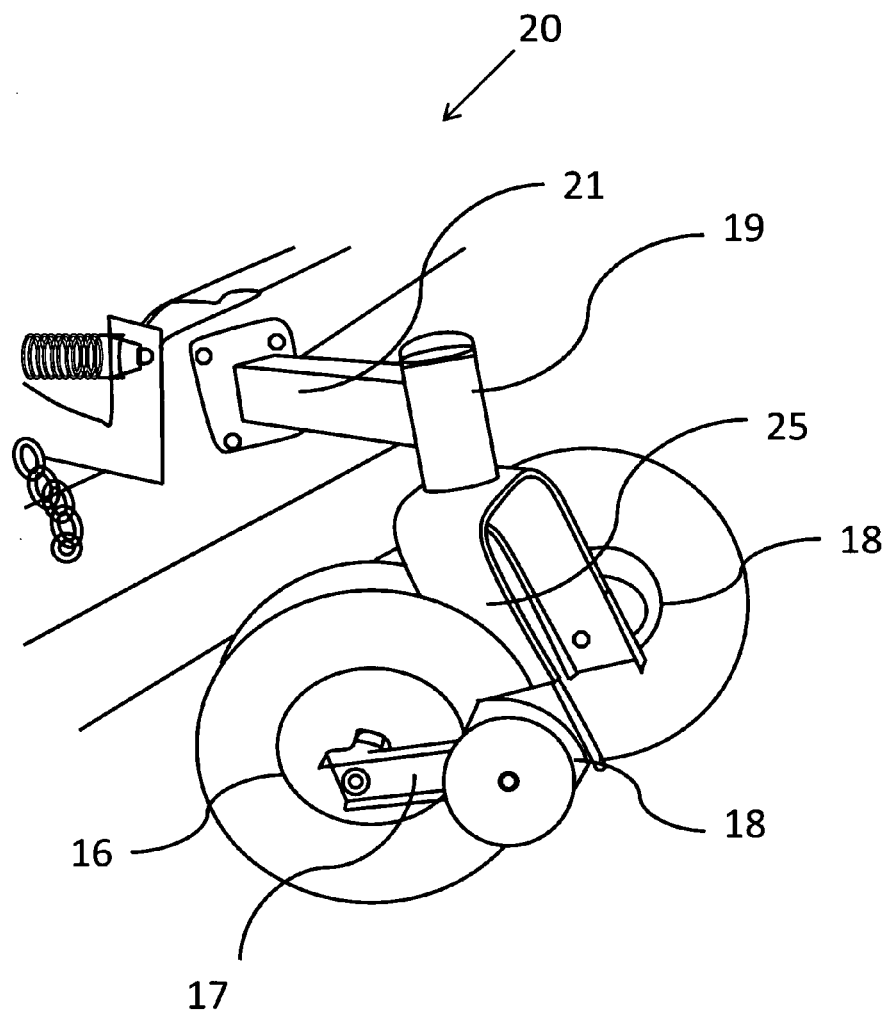
FIG. 2b illustrates a photograph of the side view of the professional landscape mower with two units comprising the compression and torsion damping wheel suspension system, the units being incorporated at both sides of the yoke bolting the offset shaft to the vertical pivot axis.

FIG. 2b illustrates at 20 a photograph of an alternate embodiment of the compression and torsion damping wheel suspension system 18. Separate units of the system 18 are incorporated at two sides of the yoke 25. In this embodiment, the outer casing of the compression and torsion damping wheel suspension system 18 is integrally attached to the yoke 25 as shown. The central shaft of each unit of the compression and torsion damping wheel suspension system 18 is attached to the offset shaft 17. With this arrangement, the motion of shaft 17 is damped by the elastomeric rubber elements and spring. The yoke is attached to the vertical pivot 19, which is attached to the lawn mower body through the attachment rod 21. The compression and torsion damping wheel suspension system 18 contains elastomeric damping elements, and may also contain a torsion spring. Thus the offset shaft 17 on either side of yoke 25 may move up and down according to the bumps and resistance felt by the wheel, thereby accommodating tilt and angular inclinations of the front wheel of the riding lawn mower.

Figure 3:
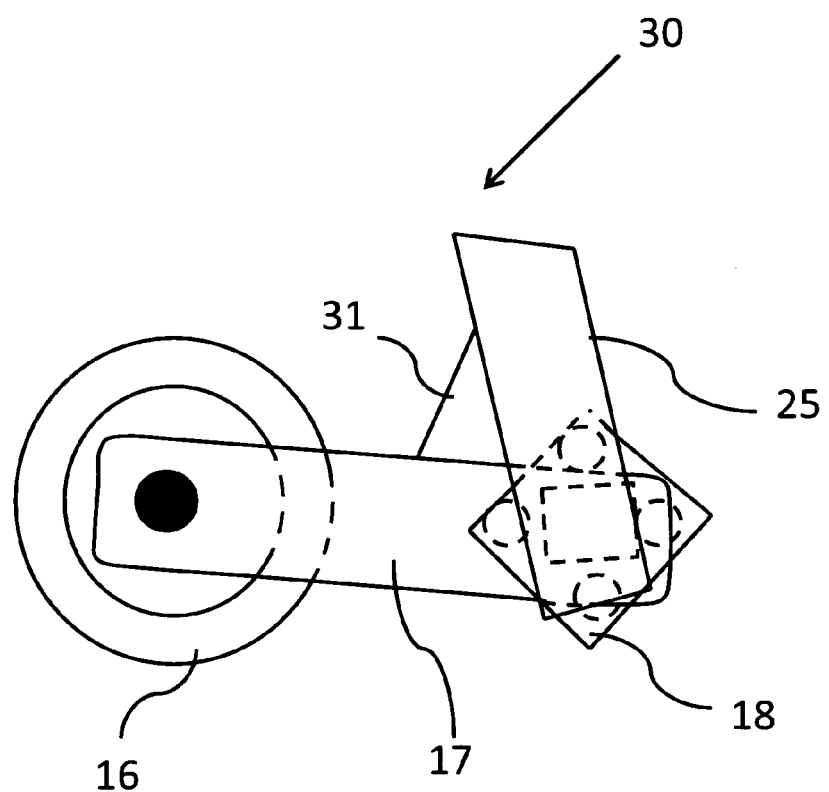
FIG. 3 schematically illustrates a rubber busing provided at the attachment location of the offset shaft to the pivot axis yoke incorporating the compression and torsion damping wheel suspension system.

FIG. 3 shows at 30 the compression torsion damping wheel suspension system 18 attached to offset shaft 17 at the connection to the pivot axis yoke 25 wherein a rubber bushing 31 is provided. The rubber bushing 31 is attached to the offset shaft 17 at one end and to the yoke 25 at the other end. The rubber busing dampens any vibration and readily returns the offset axis to an initial position when the front wheel encounters resistance pushing the offset shaft upwards away from the ground.

Figure 4A:
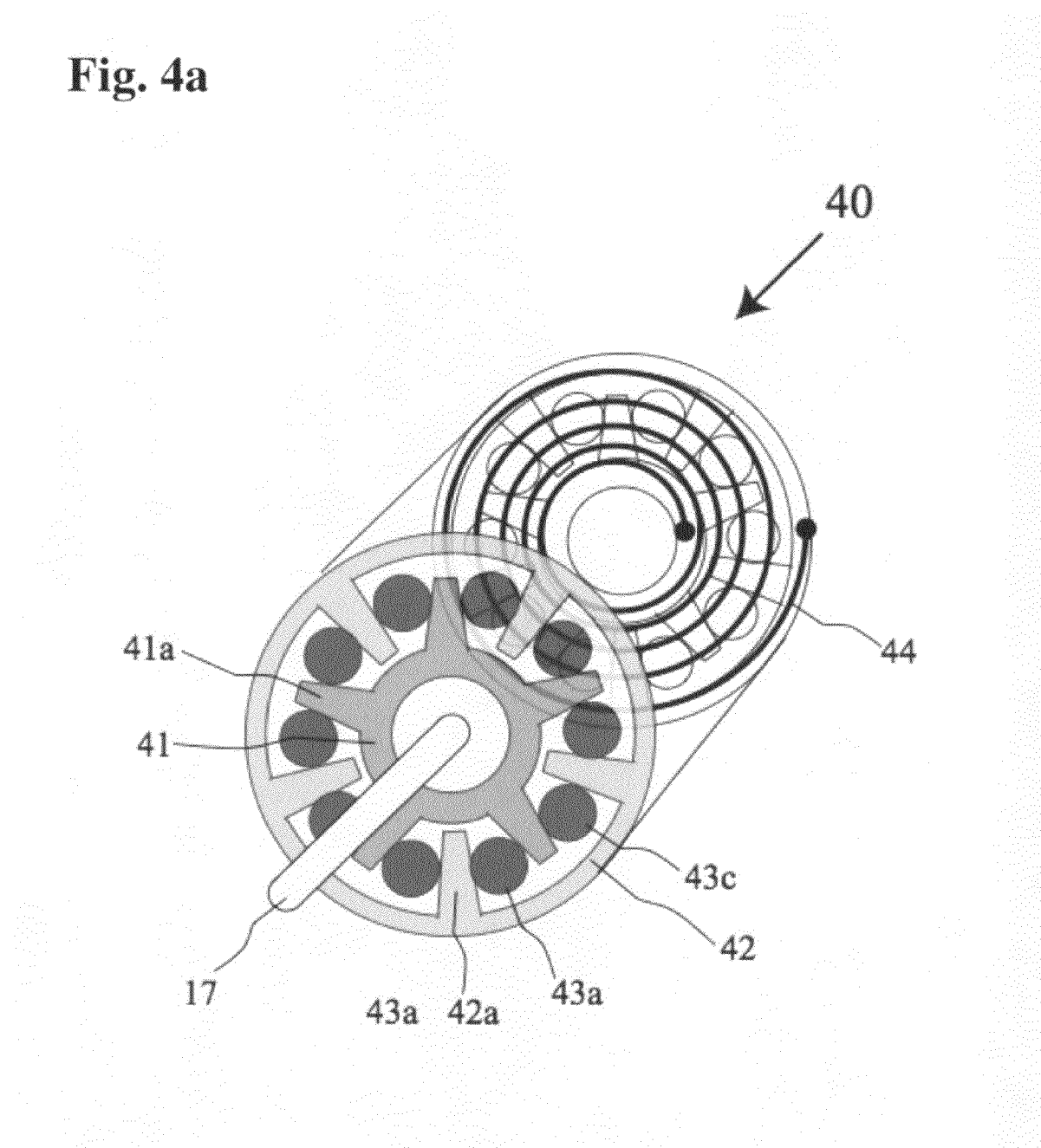
FIG. 4a schematically illustrates details of the compression and torsion damping wheel suspension with circular cross section outer tube having inward pointing projections surrounding a circular cross section inner tube having outward pointing projections and a plurality of elastomeric rubber elements incorporated within the spaces between inward and outward pointing projections.

FIG. 4a shows generally at 40 a schematic diagram of the compression and torsion damping wheel suspension system shown at 18a and 18b of FIG. 1 or replacement of 18 of FIG. 2. The inside circular cross-section hollow steel tube is shown at 41 and has at least 4 projections 41a extending on its outside surface. The outside circular cross-section hollow steel tube with at least 4 projections 42a extending on its inside surface is shown at 42. The two tubes are oriented at 36 degrees to each other while maintaining a common centerline. This results in at least 8 spaces surrounding the inner circularcross section hollow steel tube. At least 8 elastomeric rubber solid or hollow tube elements are inserted as shown at 43a, 43b and 43c, etc. Optionally, a torsional spring 44 is provided, one end of which is attached to the inside circular cross section hollow tube 41 while the other end is attached to the outside circular cross section hollow tube 42. One end of the inner circular cross section hollow steel tube is welded to a flange (not shown), which connects to one section of the offset shaft 17. In a similar manner, the outer circular cross section hollow steel tube is welded to a flange (not shown), which connects to the other section of the offset shaft. Since the outer circular cross section hollow steel tube encases the ten elastomeric rubber elements in place, they do not fall away by gravity when the compression and torsion damping wheel suspension system is in the generally horizontal orientation.

Figure 4B:
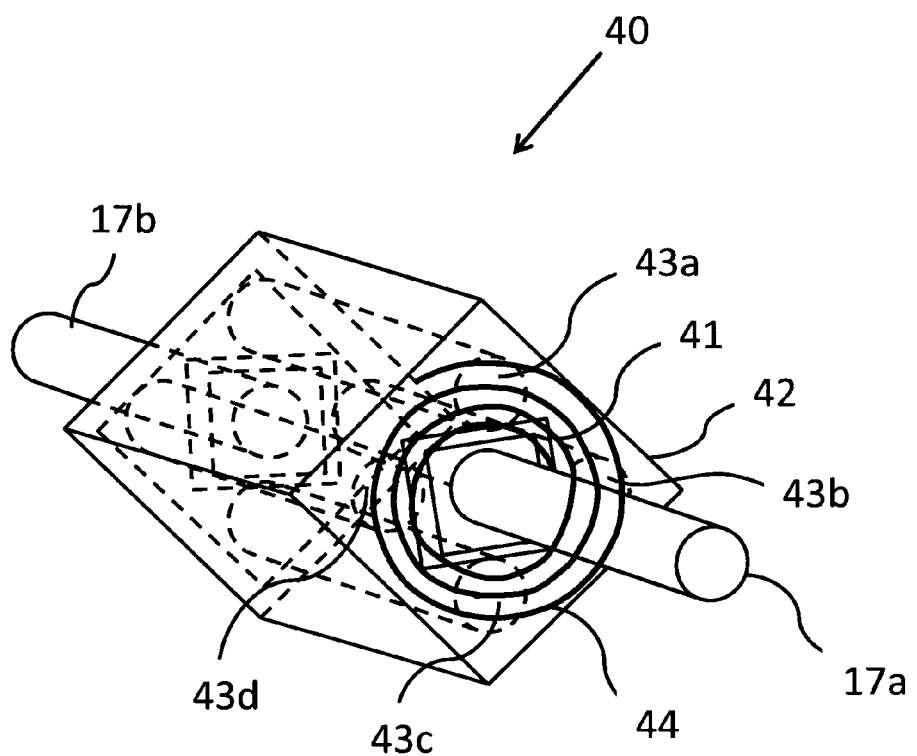
FIG. 4b schematically illustrates details of the compression and torsion damping wheel suspension with square cross section outer tube having four inward pointing projections surrounding a square cross section inner tube having four outward pointing projections and four elastomeric rubber elements incorporated within the spaces between inward and outward pointing projections.

FIG. 4b shows at 40 generally a schematic diagram of the compression and torsion damping wheel suspension system shown at 18a and 18b of FIG. 1. The inside square cross-section hollow steel tube is shown at 41. The outside square cross-section hollow steel tube is shown at 42. The two tubes are oriented at 45 degrees to each other while maintaining a common centerline. This results in four spaces surrounding the inner square cross section hollow steel tube. Four elastomeric rubber solid or hollow tube elements are inserted as shown at 43a, 43b, 43c and 43d. A torsional spring 44 is provided, one end of which is attached to the inside square cross section hollow tube 41 while the other end is attached to the outside square cross section hollow tube 42. One end of the inner square cross section hollow steel tube is welded to a flange (not shown), which connects to one section of the offset shaft 17a. In a similar manner, the outer square cross section hollow steel tube is welded to a flange (not shown), which connects to the other section of the offset shaft 17b. Since the outer square cross section hollow steel tube encases the four elastomeric rubber elements in place, they do not fall away by gravity when the compression and torsion damping wheel suspension system is in the generally horizontal orientation. During use, the elastomeric rubber elements are pushed upwards when the front caster wheel moves over a rock. The elastomeric elements absorb the shock, thereby protecting the rider and keeping the back traction wheels from lifting. When the freewheeling caster front wheels encounter resistance in a particular direction of movement, torsion is applied to the offset shaft which applies this torsional load as lateral compression on the elastomeric rubber elements. The elastomeric rubber elements push back, enabling the mower to quickly ride over the obstruction. The elastomeric rubber elements also absorb the shock providing a smooth ride for the operator of the professional landscape lawnmower. Owing to the shock absorption provided by the compression and torsion damping wheel suspension system, the traction back wheels do not bounce, and operate efficiently to provide consistent wheel traction.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A riding lawn mowing system, comprising:
   a) a set of two freewheeling castered front wheels and a set of two or more back wheels independently powered and set to run forwards or backwards at its own speed controlling the mowing direction without need for a steering wheel;
   b) said each of freewheeling castered front wheels attached to an offset shaft at one end and is connected to a vertical pivot yoke extending through a lawn mower frame that permits rotation of said offset shaft around a vertical pivot axis in a horizontal plane incorporating said compression and torsion damping wheel suspension system;
   c) a compression and torsion damping wheel suspension system comprising a larger first hollow tube having internal projections containing a smaller second hollow tube having external projections oriented with respect to each other, thereby creating spaces surrounding said smaller hollow tube;
   d) a plurality of elastomeric rubber elements being inserted in each of said spaces surrounding said smaller second hollow tube; and
   e) said attachment of said offset shaft to said pivot axis yoke incorporating said compression and torsion damping wheel suspension system including a plurality of separate damping rubber bushings arranged so that each side of the yoke has a damping rubber bushing thereon;
   whereby the elastomeric rubber elements absorb compressive or torsional shock imparted by the freewheeling caster wheel as said riding lawnmower rides over rough landscape terrain, the operator of said riding lawnmower is provided with a comfortable ride even at high cutting speeds, and the power driven back wheels maintain traction without bounce even when the freewheeling castered front wheels encounter resistance or uneven projections on the landscape being mowed.

2. The riding lawn mowing system as recited by claim 1, wherein said offset shaft being made in two sections that capture a compression and torsion damping wheel suspension system and one section of said offset shaft being welded or removably joined to a vertical pivot axis and another section being welded or removably joined to a caster wheel assembly.

3. The riding lawn mowing system as recited by claim 1, wherein said larger first hollow tube has a square cross section and said smaller second hollow tube has a square cross section and are oriented to each other by 45 degrees providing four spaces for receiving four elastomeric rubber elements.

4. The riding lawn mowing system as recited by claim 1, wherein said compression and torsion damping wheel suspension system additionally comprises a torsion spring with its first end attached to said larger first hollow tube and its second end attached to said smaller second hollow tube.

5. The riding lawn mowing system as recited by claim 1, wherein said elastomeric rubber elements are a solid rubber element.

6. The riding lawn mowing system as recited by claim 1, wherein said elastomeric rubber elements are a hollow rubber tube.

7. The riding lawn mowing system as recited by claim 1, wherein the elastomeric rubber elements are entirely contained within the outer hollow tube preventing its dislodgement.

8. The riding lawn mowing system as recited by claim 1, wherein the elastomeric rubber elements are held in compression between a flange that is welded to one end of the outer larger first hollow tube and a flange that is welded to the other end of inner smaller hollow tube.

9. The riding lawn mowing system as recited by claim 1, wherein the larger first hollow tube is about twice the size of the smaller second hollow tube.

10. The riding lawn mowing system as recited by claim 1, wherein the offset shaft is at least twice as long as the diameter of the freewheeling caster wheels.

11. The riding lawn mowing system as recited by claim 1, wherein the offset shaft is limited in length and its movement in the horizontal plan does not interfere with the mower blades.

12. The riding lawn mowing system as recited by claim 1, wherein said elastomeric rubber elements encounter compressive load and damp compressive shock when one of the said front freewheeling caster wheels ride over a bump or a rock.

13. The riding lawn mowing system as recited by claim 1, wherein said elastomeric rubber elements are subjected to torsional load and damp torsional shock when one of the said front freewheeling caster wheels is restricted in its movement.

* * * * *